United States Patent
Blasco Serrano

(10) Patent No.: US 10,764,010 B2
(45) Date of Patent: Sep. 1, 2020

(54) DETERMINATION OF COMMUNICATION PARAMETERS IN D2D COMMUNICATION SYSTEMS

(71) Applicant: Telefonaktiebolaget LM Ericsson (publ), Stockholm (SE)

(72) Inventor: Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/340,313

(22) PCT Filed: Oct. 10, 2016

(86) PCT No.: PCT/SE2016/050974
§ 371 (c)(1),
(2) Date: Apr. 8, 2019

(87) PCT Pub. No.: WO2018/070906
PCT Pub. Date: Apr. 19, 2018

(65) Prior Publication Data
US 2019/0260540 A1 Aug. 22, 2019

(51) Int. Cl.
*H04W 92/18* (2009.01)
*H04L 5/00* (2006.01)
(52) U.S. Cl.
CPC .......... *H04L 5/0051* (2013.01); *H04L 5/0053* (2013.01); *H04W 92/18* (2013.01)
(58) Field of Classification Search
CPC ..... H04W 8/005; H04W 76/23; H04W 92/18; H04L 5/0051; H04L 5/0053; H04L 27/26
See application file for complete search history.

(56) References Cited

U.S. PATENT DOCUMENTS 10,582,553 B2 * 3/2020 Seo ................. H04W 76/14
2015/0245334 A1 8/2015 Chang
(Continued)

OTHER PUBLICATIONS

Unknown, Author, "Contents of PSCCH for V2V over PC5", 3GPP TSG RAN WG1 Meeting #86, R1-167011, Gothenburg, Sweden, Aug. 22-26, 2016, 1-3.
(Continued)

*Primary Examiner* — Wei Zhao
(74) *Attorney, Agent, or Firm* — Murphy, Bilak & Homiller, PLLC

(57) ABSTRACT

This disclosure pertains to a method for operating a terminal (10) for a wireless communication network. The terminal (10) is adapted for device-to-device, D2D, communication. The method comprises decoding first data contained in a first D2D message based on a determination of first demodulation reference signaling and/or first scrambling coding associated to the first data, wherein the determination of demodulation reference signaling and/or scrambling coding is based on information extracted from a second D2D message different from the first D2D message, the second D2D message pertaining to second data to which second reference signaling and/or second scrambling coding is associated, the second reference signaling and/or second scrambling coding being different from the first reference signaling and/or second scrambling coding. The disclosure also pertains to related devices and methods.

3 Claims, 8 Drawing Sheets

(56) References Cited

U.S. PATENT DOCUMENTS

2016/0044666 A1* 2/2016 Shin ................. H04W 72/1278
370/336
2018/0123769 A1* 5/2018 Pelletier ................. H04L 5/001

OTHER PUBLICATIONS

Unknown, Author, "DMRS design details for PSCCH, PSSCH and PSBCH", 3GPP TSG RAN WG1 Meeting #86, R1-166959, Gothenburg, Sweden, Aug. 22-26, 2016, 1-3.

Unknown, Author, "Further randomization on DMRS and scrambling code", 3GPP TSG RAN WG1 #86bis, R1-1608983, Lisbon, Portugal, Oct. 10-14, 2016, 1-3.

* cited by examiner

DETERMINATION OF COMMUNICATION PARAMETERS IN D2D COMMUNICATION SYSTEMS

TECHNICAL FIELD

This disclosure pertains to a wireless communication, in particular device-to-device (D2) communication.

BACKGROUND

During Release 12, the LTE standard has been extended with support of device to device (D2D) communication (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

One of the potential extensions for the device to device work consists of support of V2x communication, which includes any combination of direct communication between vehicles, pedestrians and infrastructure. V2x communication may take advantage of a NW infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology.

For D2D communication there are generally considered retransmission techniques, which may be HARQ techniques or similar thereto, to facilitate correct transmission and reception (respectively decoding) of data.

SUMMARY

D2D communication, which may generally be referred to as sidelink or, in particular in the context of 3GPP and/or LTE technology, ProSe (PROximity SErvices), brings new challenges, in particular in the context efficient and correct decoding of received data. It is an object of this disclosure to provide approaches allowing improved handling of received data, in particular of providing efficient decoding of data even in cases in which control information (e.g., information indicating demodulation reference signaling and/or scrambling coding) is not correctly received, in particular in the context of retransmission of data.

Accordingly, there is disclosed a method for operating a terminal for a wireless communication network. The terminal is adapted for device-to-device, D2D, communication. The method comprises decoding first data contained in a first D2D message based on a determination of first demodulation reference signaling and/or first scrambling coding associated to the first data. The determination of demodulation reference signaling and/or scrambling coding is based on information extracted from a second D2D message different from the first D2D message, the second D2D message pertaining to second data to which second reference signaling and/or second scrambling coding is associated. The second reference signaling and/or second scrambling coding is different from the first reference signaling and/or second scrambling coding.

Moreover, there is disclosed a terminal for a wireless communication network, the terminal being adapted for device-to-device, D2D, communication. The terminal is adapted for decoding first data contained in a first D2D message based on a determination of first demodulation reference signaling and/or first scrambling coding associated to the data, wherein the determination of demodulation reference signaling and/or scrambling coding is based on information extracted from a second D2D message different from the first D2D message, the second D2D message pertaining to second data to which second reference signaling and/or second scrambling coding is associated, the second reference signaling and/or second scrambling coding being different from the first reference signaling and/or second scrambling coding. The terminal may comprise a decoding module for performing the demodulating, and/or a receiving module for receiving any one of the D2D messages mentioned herein, and/or a determination module for performing any of the determination/s mentioned herein.

There is also disclosed a program product comprising instructions, the instructions causing control circuitry to perform and/or control any one of the methods described herein, in particular when executed on and/or by the control circuitry.

A carrier medium may also be considered, the carrier medium carrying and/or storing a program product as described herein, and/or instructions causing control circuitry to perform and/or control any one of the methods described herein.

The approaches described herein allow decoding of data in different messages even if control information for one message has not been correctly received, in particular for retransmission techniques, e.g. HARQ techniques. It should be noted that the approaches described herein are specifically described in the context of D2D communication. However, they are also applicable for cellular communication.

It may thus be considered to replace the term "D2D message" with "message" or "cellular message", respectively "D2D" with cellular and/or "D2D communication" with "cellular communication" or "communication". In this case, the extracted information and/or control information and/or scheduling assignment may in particular represent downlink control information, e.g. in a downlink control information message like DCI in 3GPP and/or LTE standards, and/or on a (physical) downlink control channel. The control information may be sent in separate messages from the data in this approach, e.g. on different channels. Data may in particular be sent on a downlink data channel. The messages carrying the data may represent retransmissions of the same data, in particular in the context of a HARQ process.

In the context of this disclosure, decoding may in particular comprise demodulating and/or descrambling, in particular based on a determined demodulating reference signaling and/or scrambling coding.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

References to time and/or frequency resources (e.g., subframe, slot, symbol or resource block) may refer to such resources structured according to 3GPP standards, in particular LTE. It may be considered that decoding may comprise decoding of error detection coding and/or forward error coding. The extracted information may generally be and/or comprise control information, in particular in a scheduling assignment. It may be considered that the extracted information is received on a control channel and/or is based on control channel signaling. Control channel signaling may in particular be signaling on a physical control channel.

A D2D message may generally be a message transmitted via D2D communication and/or an air interface for direct (terminal-to-terminal) communication. A D2D message may comprise control information and/or data. Control information may generally comprise scheduling information and/or a scheduling assignment. It may be considered that control information and/or a scheduling assignment comprises information indicating resource/s and/or modulation and/or coding and/or the number of retransmissions pertaining to data, which may be data in the same message or in a different message. Generally, control information may pertain to data, e.g. specific data and/or data in a specific message. Control information pertaining to data may indicate transmission parameters with which the data is transmitted.

A scheduling assignment may in particular comprise control information indicating resource/s used for transmitting the associated data. A scheduling assignment may be included in a D2D message comprising associated data. In this context it may be considered that control information and/or the scheduling assignment is modulated and/or encoded differently from the data. Alternatively, it may be considered that a scheduling assignment is provided in a separate D2D message.

Transmission parameters may indicate, and/or comprise parameters, indicating modulation and/or coding and/or resource/s used for a transmission the parameters pertain to. Coding (or encoding) may in particular refer to error detection coding and/or forward error coding and/or scrambling coding.

The first D2D message may comprise the first data. It may be considered that control information is associated to the first message and/or the data of the first message, e.g. a scheduling assignment.

The second D2D message may comprise information, in particular control information, e.g. a (second) scheduling assignment, indicating the first demodulation reference signaling and/or first scrambling coding. It may be considered that the second D2D message may comprise the second data. Alternatively, the second data may be included in a separate message (e.g., separate from the first D2D message and the second D2D message, and/or a message including control information pertaining to the first data).

Scrambling coding may be considered pertaining to scrambling of data onto resources, e.g. resource elements. This may include distributing data to be transmitted onto resources according to a specific scrambling code, e.g. to improve transmission quality and/or diversity. For each scrambling coding, there may be associated a specific scrambling code.

Decoding may generally be performed based on a determination that the control information and/or scheduling assignment associated to and/or included in the first message is not correctly (e.g., not at all) received and/or decoded. Thus, a backup solution allowing decoding of data is provided even if the associated control information is missing or includes error.

It may be considered that the first data and the second data are the same and/or contain or represent the same information and/or represent and/or comprise and/or are comprised of the same block of data, e.g. transport block. Blocks of data may be considered the same if they, e.g., comprise the same sequence of bits, in particular before coding and/or modulation and/or scrambling and/or mapping to resources and/or interlacing with demodulation reference signaling.

Different D2D messages may be different in terms of the time-frequency resources they are transmitted on and/or received. The first D2D message may be received on different time-frequency resources than the second D2D message, in particular at different time, and/or in a different slot or subframe. In particular, the first D2D message may be received before or after the second D2D message. Accordingly, it should be noted that the terms "first" and "second" do not necessarily indicate an order in time. This notwithstanding, there may be variants in which the first D2D message is received (and/or transmitted) before the second D2D message, in particular such that the second D2D message pertains to a retransmission of the data in the first D2D message.

A terminal may be adapted for one or more (cellular) Radio Access Technologies (RATs), e.g. LTE and/or UMTS and/or a 5G RAT, e.g. LTE Evolution and/or NR). Generally, a terminal may be any device adapted for wireless communication via D2D and/or one or more cellular RATs. A wireless communication network may comprise two or more terminals communicating via D2D communication, and/or a terminal communicating with a radio access node of a RAN (Radio Access Network) implementing one or more RATs. Such a radio access node may e.g. be an eNodeB. It may generally be considered that a terminal represents a device capable of serving as an end or termination point of a communication. A terminal may be a user equipment or phone or smart phone or computing device or sensor device or machine or vehicular device adapted for wireless communication as described herein. A terminal adapted for D2D communication may in particular adapted for V2x and/or V2V and/or V2P and/or V2I communication. It may be considered that a terminal is mobile. However, there may be envisioned variants in which a terminal is stationary.

Information extracted from a D2D message may generally be information extracted directly and/or indirectly from the D2D message. For example, information extracted may be information read from one or more fields in the second D2D message and/or control information and/or a scheduling assignment of the second D2D message. The method for operating a terminal may comprise corresponding extracting, and/or the terminal may be adapted for such extracting and/or comprise a corresponding extracting module.

Alternatively or additionally, the information may be extracted from determining one or more parameters based on the second D2D message, e.g. from determining a CRC (Cyclic Redundancy Check) and/or a hash value for the control information and/or the message and/or the scheduling assignment, and/or a specific number of bits decoded from the message and/or control information and/or scheduling assignment. Extracting the information may comprise mapping the one or more parameters to a demodulation reference signaling and/or a scrambling coding, e.g. based on information stored in a memory and/or configured by a radio access node and/or another terminal. For example, mapping may be performed on a table indexing one or more parameters to demodulation reference signaling and/or scrambling coding, respectively one or more indications indicating and/or representing such signaling and/or coding.

A determination of demodulation reference signaling and/or scrambling coding may in particular be considered to be based on information extracted as described herein. It may be considered that the determination is additionally based on information extracted from the first D2D message. Such information may e.g. be used to replace and/or complete information extracted from the second D2D message. For example, the information extracted from the first D2D message may indicate one or more transmission parameters specific to the first D2D message, for example resource/s used for transmission. Such information may in particular by implicit to the first D2D message and/or be available without decoding, e.g. from physical characteristics like reception time and/or frequency or subcarrier used.

The method for operating a terminal may comprise decoding the second D2D message, and/or extracting the information based on the decoded second D2D message, respectively the control information (scheduling assignment) contained therein. The terminal may be adapted accordingly, and/or comprise a corresponding module.

The first data and the second data, respectively corresponding messages, may represent transmissions of the same data and/or data block and/or transport block.

BRIEF DESCRIPTION OF THE DRAWINGS

The drawings are provided to illustrate and elucidate approaches and concepts described herein, and are not intended to limit their scope to the content of the drawings, which comprise.

DETAILED DESCRIPTION

D2D communication and/or V2x communications may carry both non-safety and safety information. Applications and services may be associated with specific requirements sets, e.g., in terms of latency, reliability, capacity, etc.

ETSI has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM: The DENM message is event-triggered, such as by braking, and the availability of a DENM message is also checked for every 100 ms, and the requirement of maximum latency is <=100 ms.

The package size of CAM and DENM message varies from 100+ to 800+ bytes and the typical size is around 300 bytes. The message is supposed to be detected by all vehicles in proximity.

The SAE (Society of the Automotive Engineers) also defined the Basic Safety Message (BSM) for DSRC with various messages sizes defined.

According to the importance and urgency of the messages, the BSMs are further classified into different priorities.

For sidelink D2D/V2V, 3GPP has agreed to support up to two transmissions of data, e.g. in a single transport block (TB). Each of the transmissions is accompanied by the transmission of associated control information (e.g., a scheduling assignment or SA). Each SA contains fields with information that is necessary for processing (e.g., demodulating, decoding, etc.) each of the transmissions. This is indicated in FIG. 2.

In general, it is desirable that any of the transmissions can be decoded with any of the associated SAs. Note that the contents of each of the SAs may be different. For example, SA1 may indicate that it schedules the first transmission, whereas SA2 may indicate that it scheduled the second transmission (indicating retransmission).

Figure 1:
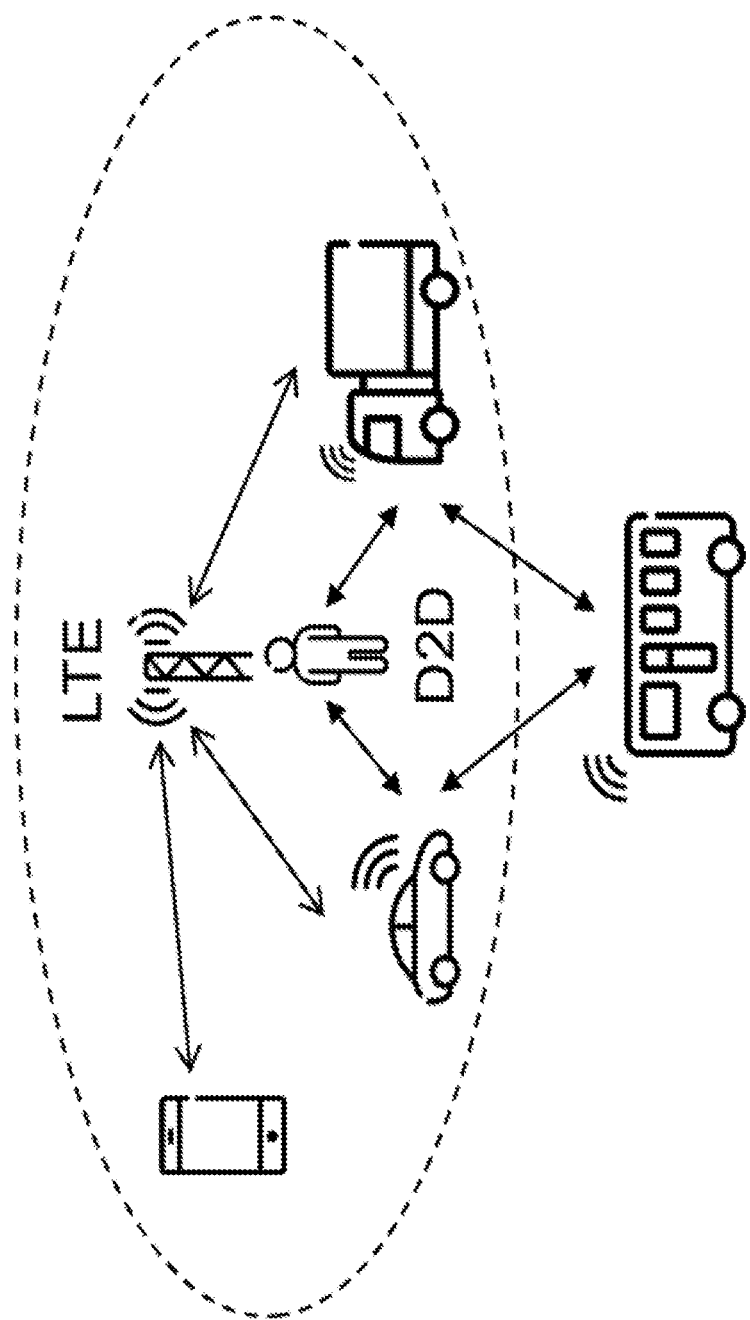
FIG. 1, showing exemplary V2x scenarios for an LTE-based NW.
Figure 2:
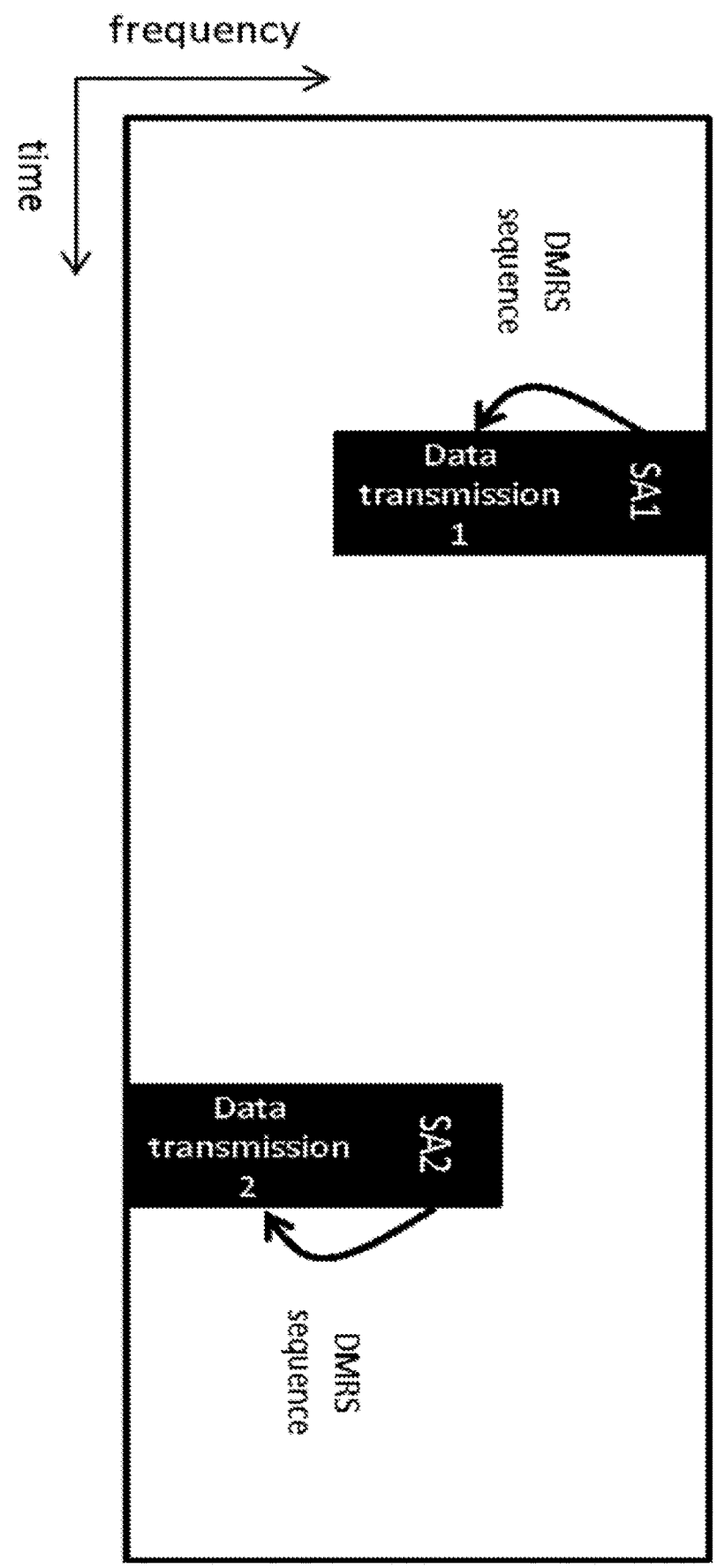
FIG. 2, showing two D2D messages with associated scheduling assignments.

FIG. 2 shows two transmissions of a single transport block (representing the first data and the second data being the same data). The SAs respectively contain information that is necessary for decoding the associated (data) transmission. In addition, it is desirable that the information contained in the SAs also allows for decoding the other (data) transmission For sidelink V2V, 3GPP has agreed that the sequences of demodulation reference signals (DMRS) symbols for each (data) transmission are obtained as a function of the contents of the associated SA. In general, it may be necessary to know the sequence of DMRS symbols in order to process (e.g., decode and/or demodulate) the corresponding transmission. Also, to correctly decode data, the scrambling coding utilised for the transmission may be required.

For sidelink D2D/V2V, the current agreements (on scheduling of transmissions and DMRS sequences) described in the previous section result in a suboptimal receiver implementation that cannot perform hybrid automatic repeat request (HARQ) combining. Alternatively, the receiver may implement HARQ combining at a very high complexity (note that such combining may be performed even if no ACK/NACK is utilised, but two transmissions are provided automatically without HARQ feedback).

Figure 3:
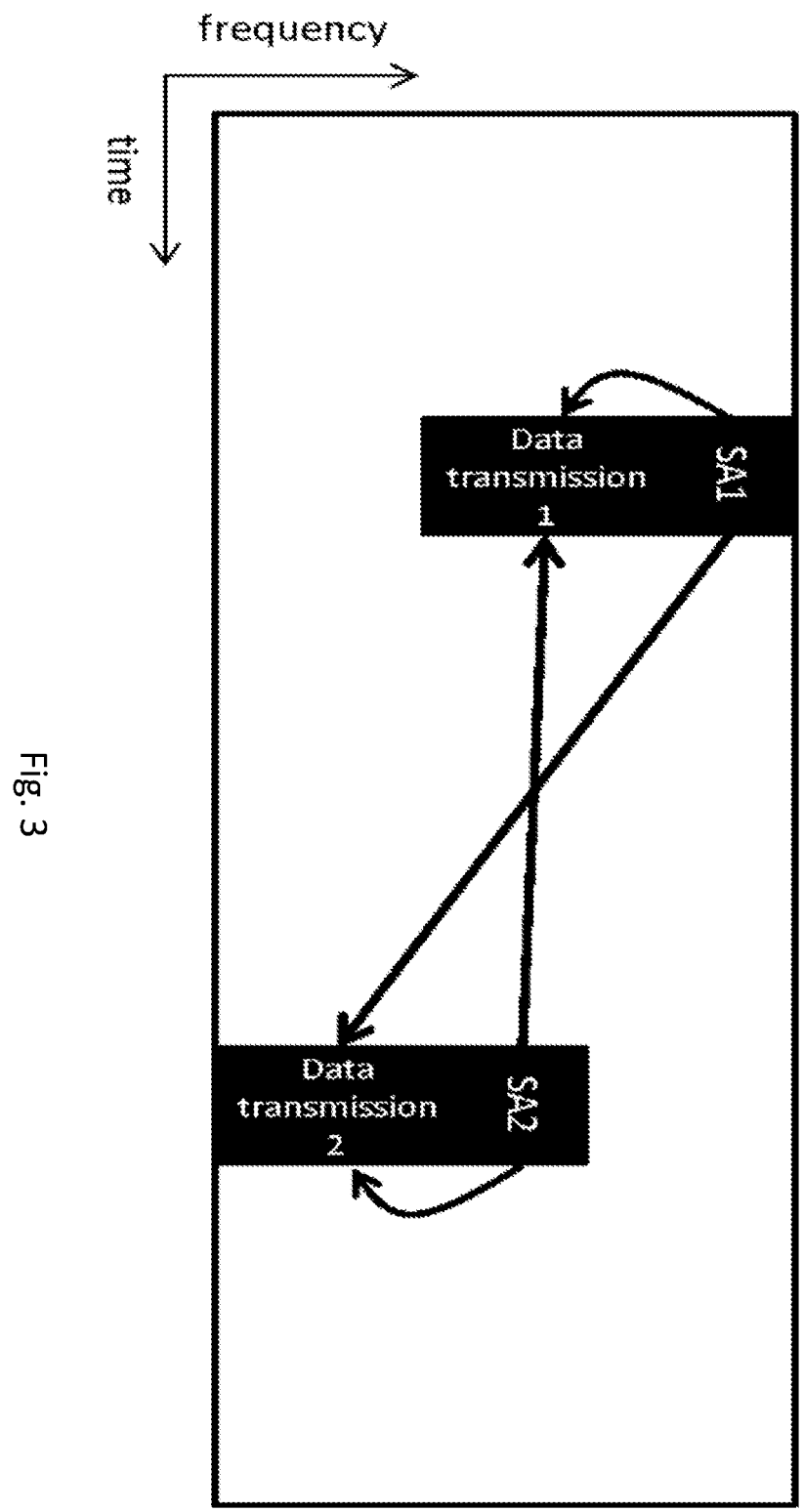
FIG. 3, showing the use of scheduling assignments for different data transmissions.

The DMRS sequence used for the first (data) transmission is determined as a function of the contents of the associated first scheduling assignment SA1. Similarly, the DMRS sequence used for the second (data) transmission is determined as a function of the contents of the second scheduling assignment SA2 associated to the second data transmission. Each transmission may be provided in a corresponding D2D message, which may comprise the associated SA. As stated before, the contents of SA1 and SA2 may be different. Consequently, the two (data) transmissions may use different DMRS sequences. This is illustrated in FIG. 3. In particular, FIG. 3 shows the DMRS sequence for each data transmission being determined as a function of the corresponding SA. Since SA1 and SA2 are not the same, the DMRS sequences used for transmission 1 and transmission 2 may not be same Due to this problem, the receiver has the following options:
- Process (e.g., decode) only the data transmissions for which it has been able to decode the associated SA. From a performance point of view, it is much more desirable to be able to process any of the transmissions given any of the associated SAs. The reason is that in this way, receiver algorithms exploiting channel diversity may be used.
- For those data transmissions for which it is not possible to decode the associated SA, it may be attempted to determine the corresponding sequence DMRS by other methods (e.g., blind hypothesis testing, etc.). This approach usually has a very high computational (receiver) complexity.

There are disclosed approaches comprising determining a communication parameter (e.g., representing the DMRS reference signaling or sequence and/or scrambling coding used with the transmission of data/for a message comprising data) without decoding the corresponding control information. The method uses the control information corresponding to another transmission (past or future) to determine the desired parameter. In particular, the information based on which the demodulation reference signaling and/or scrambling code may be extracted from the control information associated to a second data transmission, respectively the associated scheduling assignment.

The proposed approaches simplify the receiver design for HARQ (hybrid automatic repeat request) operation. In particular, it enables combing/HARQ combining at the receiver even if the control information associated with some of the (re-) transmissions is not decoded. Moreover, blind detection of the control information or any parameter than may be derived from it may be avoided.

The approaches may in particular be implemented at a receiver (a receiver may generally represent a terminal in the context of this disclosure). The approaches are generally applicable to sidelink (and/or device-to-device) communications with multiple transmissions/messages.

Figure 4:
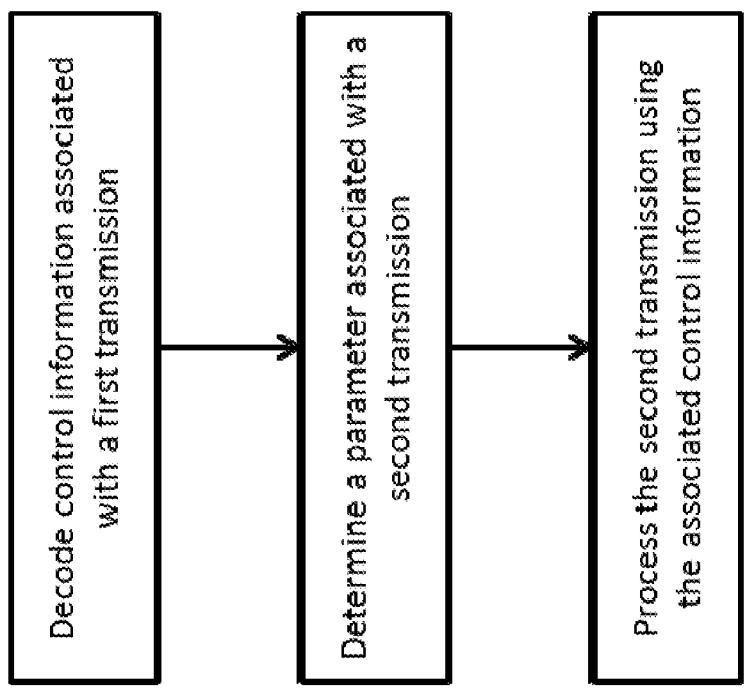
FIG. 4, showing a flow diagram of an exemplary method for operating a terminal.

For an example, there may be considered a transport block with at least two transmissions of a transport block. There may be considered the following flow:

The receiver may decode the control information associated with a first transmission of the transport block. The receiver may be adapted for such decoding, and/or comprise a corresponding decoding module. It may be considered that the receiver uses, and/or is adapted for using, and/or comprises a module for using, the decoded control information to determine a parameter associated with a second transmission of the transport block, in particular it may extract one or more parameters indicating the demodulation reference signaling and/or scrambling code). The receiver uses the control information decoded (or determined) to process (decode) the second transmission of the transport block. FIG. 4 shows a corresponding flow diagram.

As an example, 2 transmissions of a transport block (TB) may be considered. Each transmission is associated with a scheduling assignment or SA (i.e., control information). Each SA may indicate all information that is useful or necessary for reception of all the (re)transmissions of the TB, except for the DMRS sequence and/or scrambling coding. The sequence of DMRS symbols and/or scrambling coding used for each transmission may be obtained as a function of the contents of the corresponding SA. That is, the sequence of DMRS symbols/scrambling coding used for the first transmission is obtained as a function of the contents of the first SA and the sequence of DMRS symbols (scrambling coding used for the second transmission is obtained as a function of the contents of the second SA.

Each of the SA contains the same fields. These fields can be divided in two groups: A first group may comprise fields that take the same value in both SAs. These include priority indication, modulation and coding scheme (MCS), resource reservation indicator, etc. A second group may comprise fields that take a different value in each SA. These include pointer to the position of the resources of each the current and other transmission of the TB, retransmission index or number, CRC, etc.

Although the fields in the second group are different for each SA, if their value for one SA is known then it may be possible to obtain their values for the other SA. Consequently, if a SA (e.g., second SA) is correctly received and decoded, then the contents of the other SA may be determined. For example:
If a second SA is decoded and the retransmission index is 0, then it may be concluded that the value must be set to 1 in the first SA.
If a second SA is decoded, then the receiver may know the position of the resources of the first and second transmission. Then the corresponding values for the first SA may be determined.

Figure 5:
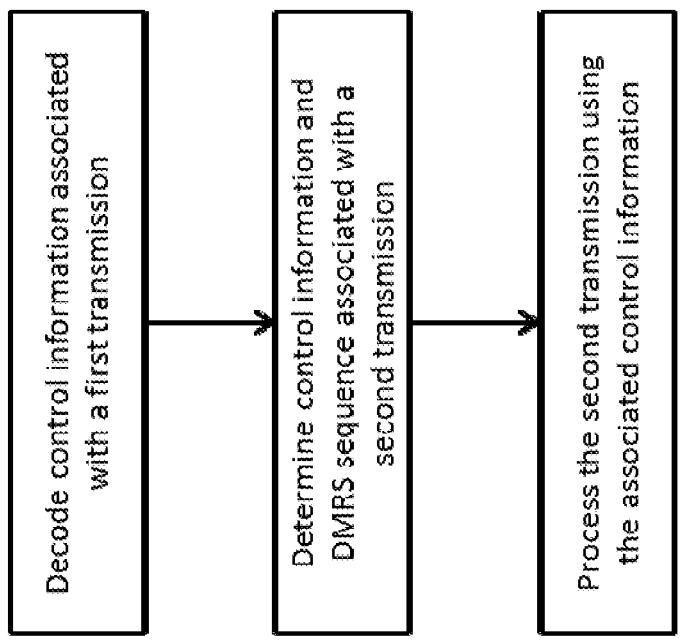
FIG. 5, showing a flow diagram of another exemplary method for operating a terminal.

A receiver may operate as indicated in FIG. 5:
A first transmission of the TB and its associated SA are received. The receiver decodes the associated SA. The receiver does not decode the TB based on the first transmission alone (e.g., because it fails to decode it; or simply because it does not attempt to decode it and instead it prefers to wait until it has the second transmission).

The receiver determines the contents of the SA associated with the second transmission of the TB. The receiver determines the DMRS sequence used for the second transmission.

The receiver decodes the TB based on the second transmission (possibly combined with the first one) without successfully decoding the associated SA (e.g., because it fails to decode it; or simply because it does not attempt to decode it).

In some variants, earlier transmissions of the control information are used to determine the contents of the control information that are transmitted later. In other embodiments, later transmissions of the control information are used to determine the contents of the control information that were transmitted earlier (i.e., the method is applied in a retroactive way). In other variants, both transmissions of the control information take place at the same time (e.g., they are multiplexed in frequency).

In some variants, the receiver may use the control information decoded or determined to determine the control information associated with a second transmission of the transport block. The control information associated with the second transmission is then used to determine a parameter associated with the second transmission.

In some variants, the parameter corresponds to the sequence(s) of DMRS symbols used for the second transmission. In some variants, the parameter corresponds to one of the parameters that describe the sequence(s) of DMRS symbols used for the second transmission (e.g., the OCC code used, the basic sequence without cyclic shift, etc.).

Other possible parameters include: transmit power, transport format, frequency band.

In some variants, processing the second transmission or determining the parameter may only be performed for a given retransmission of a TB if the receiver does not detect a SA associated to the corresponding retransmission of such TB.

In some variants, the second transmission may involve demodulating the received symbols. The demodulated symbols may be stored for later combining (e.g., using HARQ) with other transmissions.

In some variants, processing the second transmission involves decoding the transmission.

There is disclosed a method for determining a communication parameter (e.g., the DMRS sequence used with the transmission of a data packet) without decoding the corresponding control information. The method uses the control information corresponding to another transmission (past or future) to determine the desired parameter. Generally, there is disclosed a terminal adapted for performing any one of the methods disclosed herein.

Figure 6:
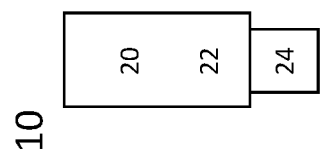
FIG. 6, schematically showing an exemplary terminal.

FIG. 6 schematically shows a terminal 10, which may be implemented in this example as a user equipment. Terminal 10 comprises control circuitry 20, which may comprise a controller connected to a memory. Any module of the terminal, e.g. receiving module and/or transmitting module and/or decoding module, may be implemented in and/or executable by the terminal, in particular the control circuitry 20, in particular as module in the controller. Terminal 10 also comprises radio circuitry 22 providing receiving and transmitting or transceiving functionality, the radio circuitry 22 (operably, e.g. to be controlled by the control circuitry) connected or connectable to the control circuitry. An antenna circuitry 24 of the terminal 10 is connected or connectable to the radio circuitry 22 to receive or collect or send and/or amplify signals. Radio circuitry 22 and the control circuitry 20 controlling it adapted for D2D communication. The terminal 10 may be adapted to carry out any of the methods for operating a terminal disclosed herein; in particular, it may comprise corresponding circuitry, e.g. control circuitry.

Figure 7:
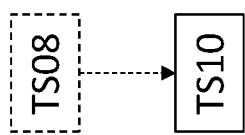
FIG. 7, schematically showing a flow diagram of a method for operating a terminal, representing a corresponding algorithm.

FIG. 7 shows a flow diagram for a method for operating a terminal, which may be any of the terminals described herein. The method comprises an action TS10 of decoding first data contained in a first D2D message based on a determination of first demodulation reference signaling and/or first scrambling coding associated to the data, wherein the determination of demodulation reference signaling and/or scrambling coding is based on information extracted from a second D2D message different from the first D2D message, the second D2D message pertaining to second data to which second reference signaling and/or second scrambling coding is associated, the second reference signaling and/or second scrambling coding being different from the first reference signaling and/or second scrambling coding. The method may comprise an optional action TS08 of decoding the second D2D message respectively associated control information.

Figure 8:
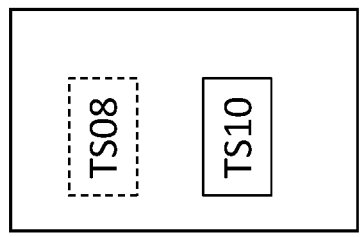
FIG. 8, schematically showing another exemplary terminal.

FIG. 8 shows an exemplary terminal. The terminal may comprise a decoding module TM10 adapted for performing action TS10. Optionally, the terminal may comprise a module TM08 adapted for performing action TS08

Generally, V2x may be considered to comprise V2I (Vehicular to Infrastructure) V2P (Vehicular to Pedestrian) and/or V2V (Vehicular to Vehicular). It may be considered that V2x is or comprises one particular form of D2D communication.

A D2D message may generally represent a single transmission of control information and/or data, in particular a transport block. It may be considered that a D2D message is a physical layer (or radio layer) message. Data may represent and/or comprise a transport block. A transport block may be considered a unit of payload data for the physical layer. A D2D message may represent and/or comprise a transmission.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA.

It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries. It may be considered that a terminal comprises more than two such independently operable circuitries. A terminal or UE may be adapted for MTC and/or comprise a corresponding MTC module. It may be considered that a terminal or UE is a M2M device, in particular a device adapted for M2M communication or MTC.

D2D communication may comprise transmission and/or reception of data. It may be considered that D2D communication may generally comprise and/or be defined by data being transmitted from one terminal, e.g. the transmitter or transmitter terminal, (in particular directly) to another terminal, e.g. the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

A channel may generally be a logical or physical channel. A channel may comprise and/or be arranged on one or more carriers, in particular a plurality of subcarriers. A control channel may be such a channel. A communication may generally involve transmitting and/or receiving messages, in particular in the form of packet data. A message or packet may comprise control and/or configuration data and/or payload data and/or represent and/or comprise a batch of physical layer transmissions. Control and/or configuration information or data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Generally, a message may comprise one or more signals and/or symbols.

A message may comprise and/or represent a self-contained block of information, which may be separated in different parts, which may comprise e.g. a header part and a data part, etc. A message may be in a prescribed format, e.g. according to a standard like LTE. It may be considered that a message may be associated to, and/or transmitted on, and/or received on an assigned channel. For example, a D2D message comprising data may be associated to, and/or received on, and/or transmitted on, a physical channel, in particular an uplink channel or sidelink channel, which in particular may be a communication channel (e.g., a channel not reserved for control), like a shared or dedicated channel (for example, PUSCH), respectively utilize and/or have assigned to it corresponding resources. Control information like a scheduling assignment may be considered to be represented by and/or in a message separate from a message containing data associated to the control information. Control information associated to data may generally indicate transmission parameters of, and/or information indicating how to decode, the data.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications. The approaches may in particular be applicable in the context of 5G technologies, e.g. according to 3GPP, in particular LTE Evolution and/or NR.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g., a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively or additionally, a cell may comprise at least one carrier for UL communication/transmission and DL communication/transmission, e.g., in TDD-based approaches.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

A cellular network or mobile or wireless communication network may comprise e.g., an LTE network (FDD or TDD), UTRA network, CDMA network, WiMAX, GSM network, any network employing any one or more radio access technologies (RATs) for cellular operation, e.g. NR. The description herein is given for LTE, but it is not limited to the LTE RAT, but could also be applicable for LTE Evolution or Next Radio or any 5G technology. It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g., around 5 GHz.

A network node may be a base station, which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA.

A cellular or wireless communication network may comprise a network node, in particular a radio network node or radio node. A network node may be connected or connectable to a core network, e.g., a core network with an evolved network core, e.g., according to LTE. A network node may, e.g., be a base station or eNodeB. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilizes the radio resources, in particular carriers and/or frequencies, and/or equipment (e.g., circuitry like radio circuitry and/or antenna circuitry, in particular transmitter and/or receiver and/or transceiver) provided and/or used for cellular operation.

Some useful abbreviations comprise:

| Abbreviation | Explanation |
| --- | --- |
| 3G | Third Generation of Mobile Telecommunications Technology |
| ARQ | Automatic Repeat reQuest |
| BSM | Basic Safety Message |
| BW | Bandwidth |
| CAM | Cooperative Awareness Message |
| CDMA | Code-Division Multiple Access |
| CRC | Cyclic Redundancy Check |
| D2D | Device-to-Device Communication |
| DENM | Decentralized Environmental Notification Message |
| DMRS | DeModulation Reference Signals |
| DSRC | Dedicated Short-Range Communications |
| eNB | eNodeB |
| ETSI | European Telecommunications Standards Institute |
| FDMA | Frequency-Division Multiple Access |
| GLONASS | Global Navigation Satellite System |
| GSM | Global System for Mobile Communications |
| GPS | Global Positioning System |
| HARQ | Hybrid ARQ |
| LTE | Long-Term Evolution |
| NW | Network |
| OFDM | Orthogonal-Frequency-Division Multiplexing |
| PSBCH | Physical Sidelink Broadcast Channel |
| SA | Scheduling Assignment |
| TA | Timing Advance |
| TB | Transport Block |
| TDMA | Time-Division Multiple Access |
| TF | Transport Format |
| UTC | Coordinated Universal Time |
| SAE | Society of the Automotive Engineers |
| UE | User Equipment |
| UL | Uplink; | generally referring to transmission of data/control information to a node/into a direction closer to a network core (physically and/or logically); in particular from a D2D device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency (in this context, the term sidelink may be utilized)

| | |
| --- | --- |
| V2I | Vehicle-to-Infrastructure |
| V2P | Vehicle-to-Pedestrian |
| V2V | Vehicle-to-vehicle communication |
| V2x | Vehicle-to-anything-you-can-imagine |
| wrt | with respect to |

Configuring a terminal or UE, by a network or network node, may comprise transmitting, by the network or network node, one or more parameters and/or commands and/or allocation data (which may comprise such parameter/s and/or command/s to the terminal or UE. It may be envisioned that configuring the terminal or UE comprises the terminal or UE changing it configuration and/or setup based on such received allocation data and/or parameters and/or commands from the network and/or the network node. A terminal or UE configured for and/or with a functionality and/or a configuration may be set up to perform and/or according such functionality, e.g. based on such configuring. A configuration may be described and/or be represented by such parameter/s and/or command/s and/or allocation data.

Generally, a carrier medium may be accessible and/or readable and/or receivable by control circuitry. Storing data and/or a program product and/or code may be seen as part of carrying data and/or a program product and/or code. A carrier medium generally may comprise and/or represent a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

The invention claimed is:

1. A method for operating a terminal for a wireless communication network, the terminal being configured to perform device-to-device (D2D) communication, the method comprising:
    decoding first data contained in a first D2D message based on a determination of first demodulation reference signaling and/or first scrambling coding associated to the first data, wherein the determination of the first demodulation reference signaling and/or the first scrambling coding is based on information extracted from a second D2D message different from the first D2D message, the second D2D message pertaining to second data to which second demodulation reference signaling and/or second scrambling coding is associated, the second demodulation reference signaling and/or second scrambling coding being different from the first demodulation reference signaling and/or the first scrambling coding.

2. A terminal for a wireless communication network, the terminal being configured to perform device-to-device (D2D) communication, the terminal comprising:
    radio circuitry; and
    control circuitry operatively coupled to the radio circuitry and configured to control the radio circuitry and to:
        decode first data contained in a first D2D message based on a determination of first demodulation reference signaling and/or first scrambling coding associated to the data, wherein the determination of the first demodulation reference signaling and/or the first scrambling coding is based on information extracted from a second D2D message different from the first D2D message, the second D2D message pertaining to second data to which second demodulation reference signaling and/or second scrambling coding is associated, the second demodulation reference signaling and/or second scrambling coding being different from the first demodulation reference signaling and/or the first scrambling coding.

3. A non-transitory computer-readable medium comprising, stored thereupon, program instructions for execution by a processor of a terminal configured to perform device-to-device (D2D) communication, the program instructions being configured to cause the terminal, upon execution of the program instructions, to:
    decode first data contained in a first D2D message based on a determination of first demodulation reference signaling and/or first scrambling coding associated to the data, wherein the determination of the first demodulation reference signaling and/or the first scrambling coding is based on information extracted from a second D2D message different from the first D2D message, the second D2D message pertaining to second data to which second demodulation reference signaling and/or second scrambling coding is associated, the second demodulation reference signaling and/or second scrambling coding being different from the first demodulation reference signaling and/or the first scrambling coding.

* * * * *